United States Patent
Kurematsu

(10) Patent No.: US 10,982,737 B2
(45) Date of Patent: Apr. 20, 2021

(54) TENSIONER

(71) Applicant: TSUBAKIMOTO CHAIN CO., Osaka (JP)

(72) Inventor: Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 188 days.

(21) Appl. No.: 16/433,291

(22) Filed: Jun. 6, 2019

(65) Prior Publication Data

US 2020/0011401 A1 Jan. 9, 2020

(30) Foreign Application Priority Data

Jul. 6, 2018 (JP) .............................. JP2018-128678

(51) Int. Cl.
*F16H 7/08* (2006.01)

(52) U.S. Cl.
CPC ... *F16H 7/0848* (2013.01); *F16H 2007/0806* (2013.01); *F16H 2007/0808* (2013.01); *F16H 2007/0817* (2013.01); *F16H 2007/0853* (2013.01); *F16H 2007/0855* (2013.01); *F16H 2007/0859* (2013.01); *F16H 2007/0895* (2013.01); *F16H 2007/0897* (2013.01)

(58) Field of Classification Search
CPC .......... F16H 7/0848; F16H 2007/0851; F16H 2007/0853; F16H 2007/0855; F16H 2007/0859; F16H 7/08; F16H 2007/0806; F16H 2007/0808; F16H 2007/0891; F16H 2007/0895; F16H 2007/0897

USPC ......................................................... 474/110
See application file for complete search history.

(56) References Cited

U.S. PATENT DOCUMENTS

| | | | | |
|---|---|---|---|---|
| 6,120,402 A | * | 9/2000 | Preston | F16H 7/08 474/109 |
| 6,244,982 B1 | * | 6/2001 | Merelli | F16H 7/08 188/277 |
| 6,994,644 B2 | * | 2/2006 | Yoshida | F16H 7/0848 474/110 |

(Continued)

FOREIGN PATENT DOCUMENTS

| | | |
|---|---|---|
| JP | 2002-5249 A | 1/2002 |
| JP | 2011-27124 A | 2/2011 |
| JP | 2012-251594 A | 12/2012 |

*Primary Examiner* — Michael R Mansen
*Assistant Examiner* — Raveen J Dias
(74) *Attorney, Agent, or Firm* — Westerman, Hattori, Daniels & Adrian, LLP

(57) ABSTRACT

To provide a simple-structured tensioner that generates less knocking noise at the start-up of the engine and that prevents an excessive chain tension, severe friction, noise or vibration during the running of the engine, while also reducing production costs. The tensioner includes a ring control mechanism that controls the position of a resilient ring. The ring control mechanism includes a front-side restricting part having a front-side restricting surface and capable of restricting forward movement of the resilient ring, and a rear-side restriction member having a rear-side restricting surface and capable of restricting rearward movement of the resilient ring. The front-side restricting part is fixed to or formed integrally with the housing. The rear-side restriction member is disposed movable in a front to back direction relative to the housing and the plunger.

8 Claims, 10 Drawing Sheets

(56) References Cited

U.S. PATENT DOCUMENTS

| | | | |
|---|---|---|---|
| 7,037,228 B2 * | 5/2006 | Yoshida | F16H 7/0848 474/109 |
| 7,063,634 B2 * | 6/2006 | Hashimoto | F16H 7/0848 474/110 |
| 2002/0094894 A1 * | 7/2002 | Poiret | F16H 7/0848 474/101 |
| 2003/0008738 A1 * | 1/2003 | Rossato | F16H 7/0848 474/110 |
| 2006/0094548 A1 * | 5/2006 | Sato | F16H 7/0848 474/109 |
| 2007/0032323 A1 * | 2/2007 | Yoshida | F16H 7/0848 474/110 |
| 2007/0179001 A1 * | 8/2007 | Sass | F16H 7/0848 474/109 |
| 2007/0213152 A1 * | 9/2007 | Yamamoto | F16H 7/0848 474/109 |
| 2010/0093474 A1 * | 4/2010 | Onimaru | F16H 7/0848 474/110 |
| 2010/0222167 A1 * | 9/2010 | Chekansky | F16H 7/0836 474/110 |
| 2011/0021298 A1 | 1/2011 | Kurematsu et al. | |
| 2011/0269584 A1 * | 11/2011 | Yoshida | F16H 7/0848 474/101 |
| 2012/0309570 A1 | 12/2012 | Kurematsu et al. | |
| 2014/0179471 A1 * | 6/2014 | Markley | F16H 7/0836 474/110 |
| 2015/0354674 A1 * | 12/2015 | Markley | F16H 7/0848 474/110 |
| 2016/0348765 A1 * | 12/2016 | Ishikawa | F16H 7/0836 |
| 2017/0211663 A1 * | 7/2017 | Furukawa | F16H 7/0836 |
| 2017/0370447 A1 * | 12/2017 | Freemantle | F16H 7/0848 |
| 2018/0119780 A1 * | 5/2018 | Heinemann | F16H 7/08 |
| 2018/0223967 A1 * | 8/2018 | Baddaria | F16H 7/08 |
| 2020/0011402 A1 * | 1/2020 | Magni | F16H 7/0848 |

* cited by examiner

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining correct tension of a chain or the like. For example, a chain guide mechanism has been known, which slidably guides, by means of a tensioner lever, a drive chain such as an endless roller chain passing over respective sprockets of a crankshaft and a cam shaft inside an engine room, and which uses a tensioner to bias the tensioner lever to maintain appropriate tension of the chain or the like.

Such a tensioner normally restricts backward movement of a plunger by a hydraulic damping effect achieved by supplying oil into an oil pressure chamber formed between the plunger and a housing hole. However, the damping does not work until the pressure oil is supplied, for example when the engine has just been started. The plunger then moves back largely, and this causes knocking noises at the time of the start-up. Some known tensioners have a ratchet mechanism wherein a resilient ring is engaged with a plurality of engaging grooves provided on an outer circumference of the plunger as disclosed in Japanese Patent Application Laid-open No. 2002-5249, for restricting backward movement of the plunger.

The tensioner that uses such a resilient ring entails the following problems: If the amount of backlash of the ratchet mechanism is set small, the rearward movement of the plunger caused by an excessive chain tension, which may result from a temperature change or the like during the running of the engine, is also restricted, because of which the plunger may seize, or the chain may keep running with an excessive tension with increased load on the chain and noise. On the other hand, if the amount of backlash is set large, the effect of reducing the knocking noises at the start-up of the engine will be lost.

Tensioners described in Japanese Patent Application Laid-open No. 2011-27124 and Japanese Patent Application Laid-open No. 2012-251594 have been proposed as a solution to the problems described above. According to Japanese Patent Application Laid-open No. 2011-27124 and Japanese Patent Application Laid-open No. 2012-251594, the angle and other features of the engaging protrusions and recesses on the plunger are adjusted such as to control the amount of backlash at the start-up of the engine, while allowing the backlash to be larger during the running of the engine.

SUMMARY OF THE INVENTION

The problem with the inventions according to Japanese Patent Application Laid-open No. 2011-27124 and Japanese Patent Application Laid-open No. 2012-251594 was that the backlash amount was controlled with the use of frictional force between the components, which necessitated precise machining of these components and led to an increased production cost.

Another problem with the inventions according to Japanese Patent Application Laid-open No. 2011-27124 and Japanese Patent Application Laid-open No. 2012-251594 was that the plunger could not move rearward until the load applied from the chain to the plunger reaches a certain magnitude. During the period before the plunger moves rearward, severe friction may occur between the chain and the tensioner lever, or large noises may be generated.

The present invention solves these problems, its object being to provide a simple-structured tensioner that generates less knocking noise at the start-up of the engine and prevents an excessive chain tension, severe friction, noise, or vibration during the running of the engine, while also reducing production costs.

The present invention achieves the above object by providing a tensioner including: a plunger having a plunger hole that is open on a rear side; a housing having a housing hole that is open on a front side and accommodates the plunger; an oil pressure chamber formed between the plunger and the housing hole; a main biasing unit that biases the plunger toward the front side; a resilient ring having a ring-like part that is disposed on an outer circumference of the plunger and engages with an engaging groove formed on an outer circumferential surface of the plunger; and a ring control mechanism that controls a position of the resilient ring, the ring control mechanism including a front-side restricting part having a front-side restricting surface disposed on the front side of the ring-like part and capable of restricting forward movement of the resilient ring, and a rear-side restriction member having a rear-side restricting surface disposed on the rear side of the ring-like part and capable of restricting rearward movement of the resilient ring, the front-side restricting part being fixed to or formed integrally with the housing, and the rear-side restriction member being disposed movable in a front to back direction relative to the housing and the plunger.

According to one aspect of the present invention, the ring control mechanism that controls the position of the resilient ring includes a front-side restricting part having a front-side restricting surface disposed on the front side of the ring-like part and capable of restricting forward movement of the resilient ring, and a rear-side restriction member having a rear-side restricting surface disposed on the rear side of the ring-like part and capable of restricting rearward movement of the resilient ring, the front-side restricting part being fixed to or formed integrally with the housing, and the rear-side restriction member being disposed movable in a front to back direction relative to the housing and the plunger. Thus, the backlash amount of the ratchet mechanism, which is formed by the resilient ring engaging with the engaging groove of the plunger, can be adjusted in accordance with the front to back movement of the rear-side restriction member. This enables favorable running of the chain with a simple structure, for example by eliminating or reducing the amount of backlash at the start-up of the engine when no oil is supplied to the oil pressure chamber so as to suppress the start-up knocking noise, and by increasing the amount of backlash during the running of the engine when oil is supplied to the oil pressure chamber so as to prevent an excessive chain tension, severe friction, noise, or vibration.

According to one aspect of the present invention, there is no need to use the biasing force of the main biasing unit to prevent backward movement of the plunger at the start-up of the engine, so that the biasing force of the main biasing unit can be set small, i.e., the degree of design freedom of the main biasing unit is improved. Also, the negative effects such as an excessive chain tension, severe friction, noise, or vibration that can accompany a larger biasing force of the main biasing unit can be avoided.

While a conventional tensioner needs a stopper pin or the like to prevent the plunger from protruding out forward from the housing in a state before the tensioner is set inside the engine, the present invention according to one aspect thereof does not require a plunger locking mechanism such as a stopper pin since the ring control mechanism eliminates or reduces the amount of backlash and can thereby prevent the plunger from protruding out forward from the housing.

Moreover, according to one aspect of the present invention, the frictional force between various components need not be depended upon in order to control the amount of backlash as in conventional tensioners, so that machining precision requirements for various components can be lowered, which helps improve the productivity of the tensioner, as well as reduces variation in production quality.

According to another aspect of the present invention, at least one of the front-side restricting surface and the rear-side restricting surface is formed such as to restrict radial expansion of the ring-like part. Thus radial expansion of the ring-like part can reliably be restricted with a simple structure, to stop unwanted disengagement of the ring-like part from the engaging groove of the plunger.

According to another aspect of the present invention, the ring control mechanism includes a restriction biasing unit that biases the rear-side restriction member to the front side, and the rear-side restriction member is disposed on the rear side of the oil pressure chamber and includes a pressed part that is pushed rearward by an oil pressure in the oil pressure chamber when the oil pressure in the oil pressure chamber rises. Thus, the rear-side restriction member can be moved rearward to increase the amount of backlash with the use of the oil pressure in the oil pressure chamber during the running of the engine, so that an excessive chain tension, severe friction, noise or vibration can be reliably prevented during the running of the engine. Also, no operation is needed to unlock the plunger. The plunger can be automatically unlocked, with the use of the oil pressure in the oil pressure chamber during the running of the engine.

According to another aspect of the present invention, the restriction biasing unit is designed to have a larger biasing force than the biasing force of the main biasing unit. At an oil non-supplied time when no oil is supplied to the tensioner, the rear-side restriction member is biased forward to restrict backward movement of the ring-like part, so as to eliminate or reduce the amount of backlash.

According to another aspect of the present invention, the rear-side restriction member is formed as a rear-side restriction sleeve having a sleeve body disposed between an inner circumferential surface of the housing hole and an outer circumferential surface of the plunger. Thus it is possible to restrict movement of the resilient ring by using the rear-side restriction sleeve, which serves the function of allowing the plunger to slide thereon instead of the housing. This enables an improvement of the degree of design freedom of the housing, as well as stable restriction of backward movement of the resilient ring, without making the structure complex.

According to another aspect of the present invention, the rear-side restriction sleeve includes a sleeve bottom formed at a rear end of the sleeve body, a sleeve through hole formed in the sleeve bottom, and a sleeve tubular part extending from an edge of the sleeve through hole toward the rear side. The housing includes an oil supply hole that is formed to extend from an outer surface of the housing through to the housing hole for supplying oil to the oil pressure chamber from outside, and at least part of the sleeve tubular part is inserted in the oil supply hole. Thus the rear-side restriction sleeve can be maintained in a favorable posture, and oil can be supplied into the rear-side restriction sleeve in a favorable manner.

According to another aspect of the present invention, the tensioner further includes a third oil pressure chamber to which oil is introduced from outside. The rear-side restriction member is disposed on the rear side of the third oil pressure chamber and includes a second pressed part that is pushed rearward by an oil pressure in the third oil pressure chamber when the oil pressure in the third oil pressure chamber rises. Thus the rear-side restriction member can be pressed toward the rear side by the oil pressure in the third oil pressure chamber when oil is supplied, i.e., the rear-side restriction member can be swiftly moved backward at the start of oil supply to the tensioner.

According to another aspect of the present invention, a second oil pressure chamber formed between the rear-side restriction member and an inner wall of the housing is formed on the rear side of at least part of the rear-side restriction member. Thus it is possible to stop forward movement of the rear-side restriction member with a negative pressure created inside the second oil pressure chamber when the rear-side restriction member attempts to move forward, so that the state in which the rear-side restriction member has moved to the rear side can be stably maintained during the running of the engine when oil is supplied to the tensioner.

DESCRIPTION OF THE PREFERRED EMBODIMENTS

A tensioner 10 according to one embodiment of the present invention will be described below with reference to the drawings.

Figure 1:
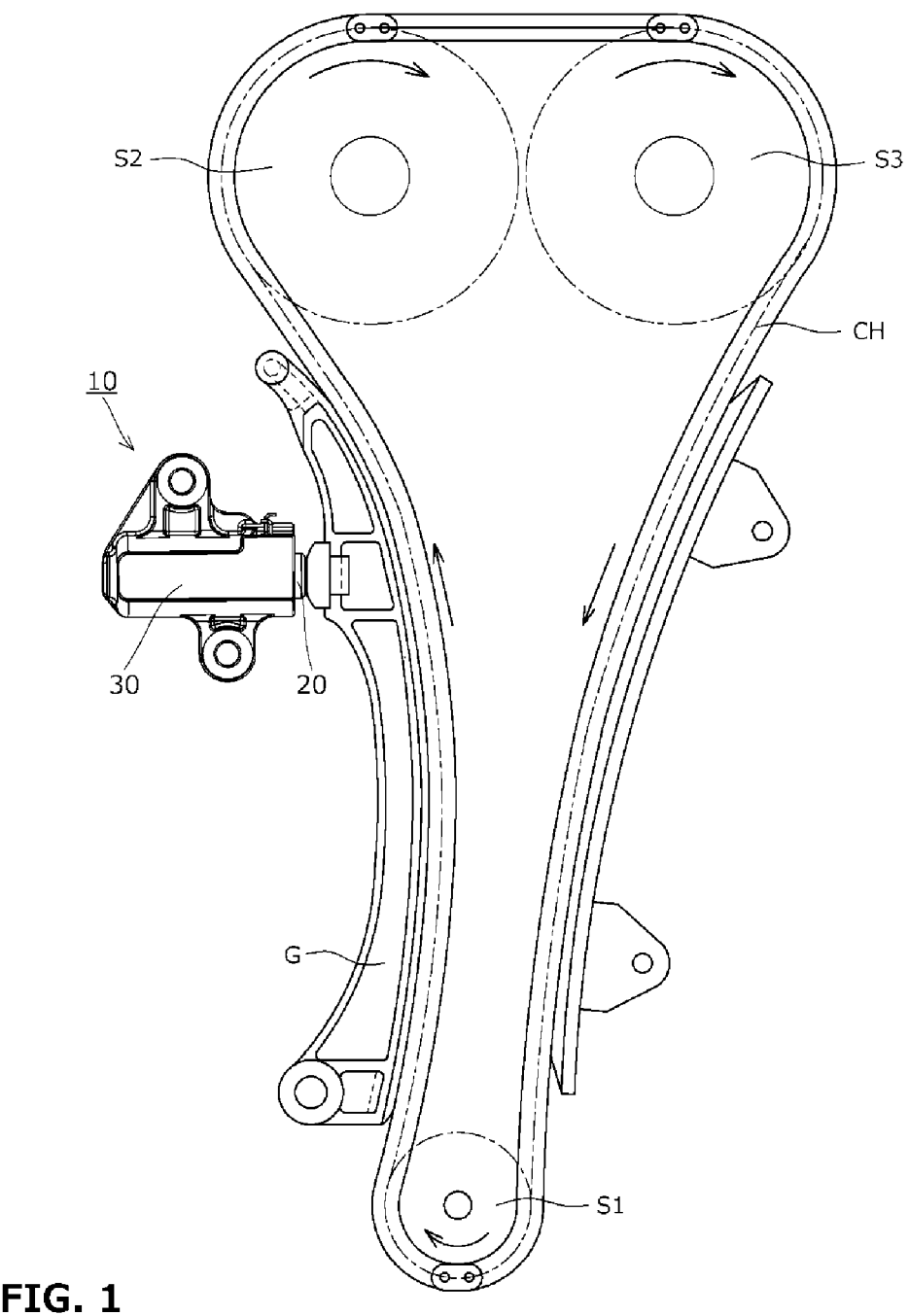
FIG. 1 is an illustrative diagram illustrating a timing system in which a tensioner according to a first embodiment of the present invention is incorporated.

First, the tensioner 10 is incorporated in a chain transmission used in a timing system or the like of a car engine. As shown in FIG. 1, the tensioner is attached to an engine block (not shown) to apply appropriate tension to the slack side of a drive chain CH passing over a plurality of sprockets S1 to S3 via a tensioner lever G to reduce vibration during the drive.

Figure 2:
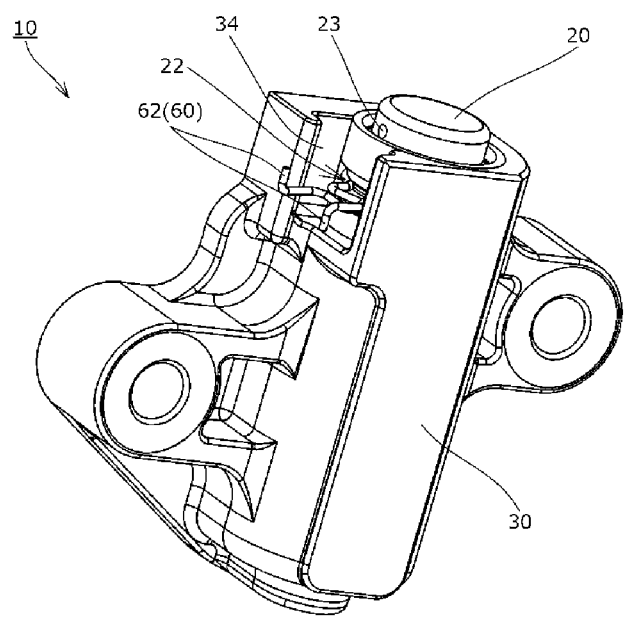
FIG. 2 is a perspective view illustrating the tensioner of the first embodiment.
Figure 3:
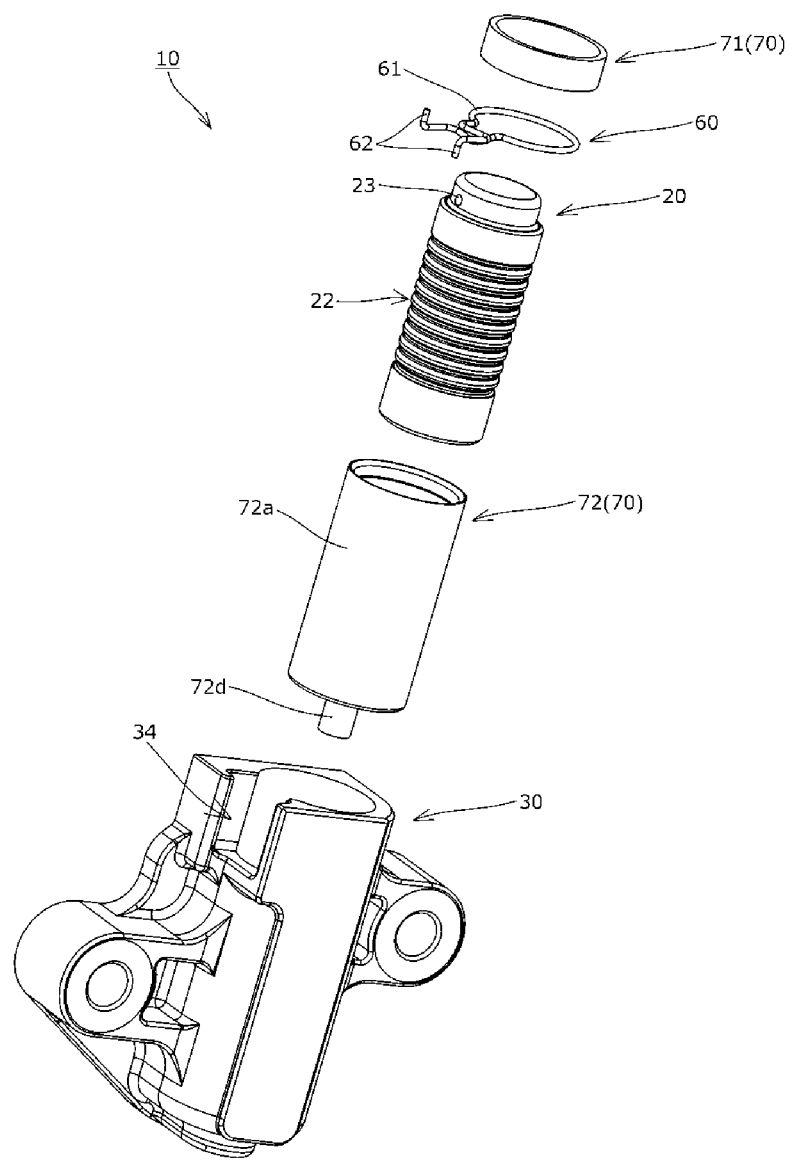
FIG. 3 is a perspective view showing some parts of the tensioner of the first embodiment.
Figure 4:
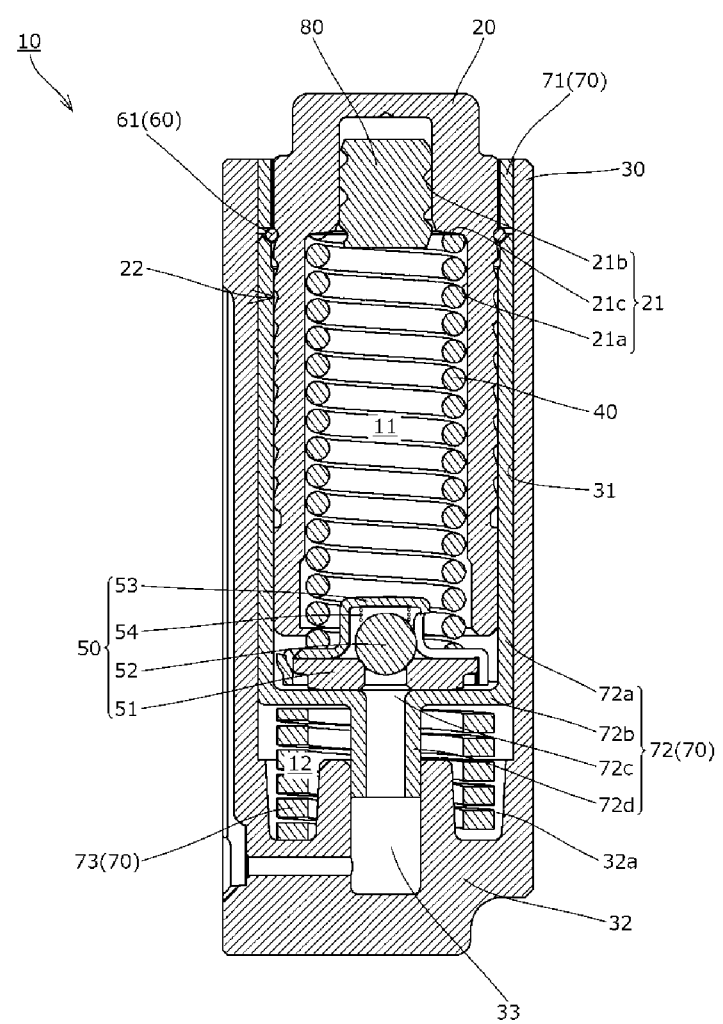
FIG. 4 is a cross-sectional view illustrating the tensioner of the first embodiment.

The tensioner 10 includes, as shown in FIG. 2 to FIG. 4, a plunger 20 having a cylindrical plunger hole 21 that is open on a rear side, a housing 30 having a housing hole 31 that is open on a front side and accommodates the plunger 20, a first oil pressure chamber 11 formed between the plunger 20 and the housing hole 31 (more specifically, between the plunger 20 and a rear-side restriction sleeve 72), a main spring 40 as a main biasing unit that is accommodated inside the first oil pressure chamber 11 such as to be able to expand and contract and to bias the plunger 20 toward the front side, a check valve 50 that allows oil to flow from an oil supply hole 33 into the first oil pressure chamber 11 and prevents the oil from flowing out of the first oil pressure chamber 11 to the oil supply hole 33, a resilient ring 60 engaging with an engaging groove 22 formed on an outer circumferential surface of the plunger 20 to restrict rearward movement of the plunger 20, a ring control mechanism 70 that controls the position of the resilient ring 60, and an orifice 80 set inside the plunger 20.

Hereinafter, various constituent elements of the tensioner 10 will be described with reference to the drawings.

First, the plunger 20 is made of metal such as iron or the like and inserted in the housing hole 31 (more specifically, inside the rear-side restriction sleeve 72) such as to be able to move back and forth in the front to back direction, as shown in FIG. 4.

The plunger hole 21 includes a large-diameter hole 21a on the rear side, a small-diameter hole 21b on the front side continuously and coaxially formed on the front side of the large-diameter hole 21a, and a stepped portion 21c formed between these large-diameter hole 21a and small-diameter hole 21b as shown in FIG. 4.

The outer circumferential surface of the plunger 20 is serrated with a plurality of annular engaging grooves 22 in a row in the front to back direction as shown in FIG. 3.

The plunger 20 is formed with a through hole 23, as shown in FIG. 2, which extends from an outer surface through to the small-diameter hole 21b of the plunger 20.

The housing 30 is made of metal such as aluminum alloy, or synthetic resin and the like, and includes, as shown in FIG. 2 to FIG. 4, the cylindrical housing hole 31 open to the front side, a housing bottom 32 formed on the rear side, the oil supply hole 33 formed in the housing bottom 32 such as to extend from an outer surface of the housing 30 through to the housing hole 31 for supplying oil from outside the housing 30 into the first oil pressure chamber 11, and a cut-out groove 34 formed by cutting off a circumferential portion at the front end of the housing 30 toward the rear side.

On the front face of the housing bottom 32 is formed an annular recess 32a recessed toward the rear side around the oil supply hole 33 as shown in FIG. 4.

The oil supply hole 33 is connected to an oil pump (not shown) provided in an engine (not shown) when the housing is attached to the engine block (not shown).

The main spring 40 is configured as a coil spring made of metal or the like and has one end abutting on the stepped portion 21c of the plunger hole 21 and the other end arranged in contact with the check valve 50 (retainer 53) as shown in FIG. 4.

The main spring 40 thus biases the plunger 20 to the front side as shown in FIG. 4, as well as presses the check valve 50 (the retainer 53 and a seat member 51) against the sleeve bottom 72b of the rear-side restriction sleeve 72.

The check valve 50 is set on the front side of the sleeve bottom 72b inside the rear-side restriction sleeve 72 as shown in FIG. 4.

The check valve 50 is made up of a seat member 51, a spherical valve member 52 that sits on the seat member 51 in tight contact therewith, a retainer 53 set on the front side of the valve member 52 to restrict movement of the valve member 52, and a valve spring 54 that biases the valve member 52 toward the seat member 51. The valve spring 54 need not necessarily be provided.

The resilient ring 60 has a substantially annular ring-like part 61 and a pair of arms 62 extending from both ends of the ring-like part 61 as shown in FIG. 2 or FIG. 3, and is configured such that the ring-like part 61 is radially expanded when the pair of arms 62 are brought closer to each other.

Figure 6:
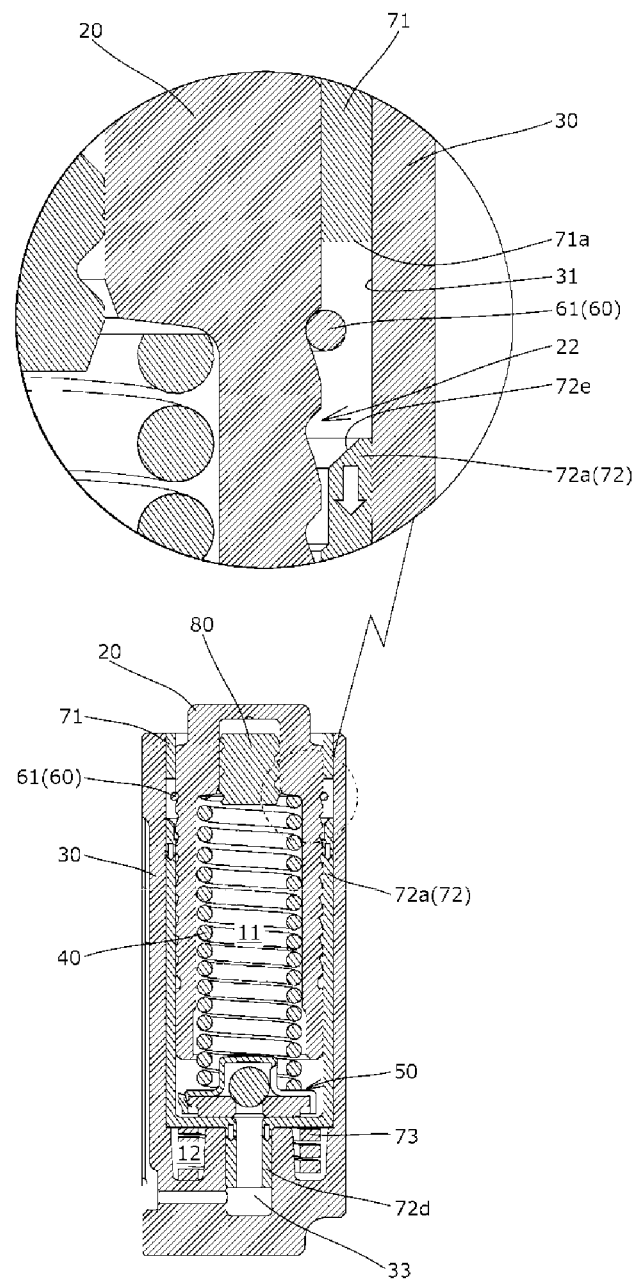
FIG. 6 is an illustrative diagram showing a condition of the tensioner of the first embodiment when oil is supplied.

The distance between the inner circumferential surface of the housing hole 31 and the outer circumferential surface (engaging grooves 22) of the plunger 20 is set such as to allow the ring-like part 61 to be radially expanded, as shown in FIG. 6.

The ring-like part 61 is set on the outer circumference of the plunger 20 such as to engage with the engaging groove 22 of the plunger 20, as shown in FIG. 4.

The pair of arms 62 are disposed partly outside the housing 30 through the cut-out groove 34 of the housing 30, as shown in FIG. 2.

Figure 5:
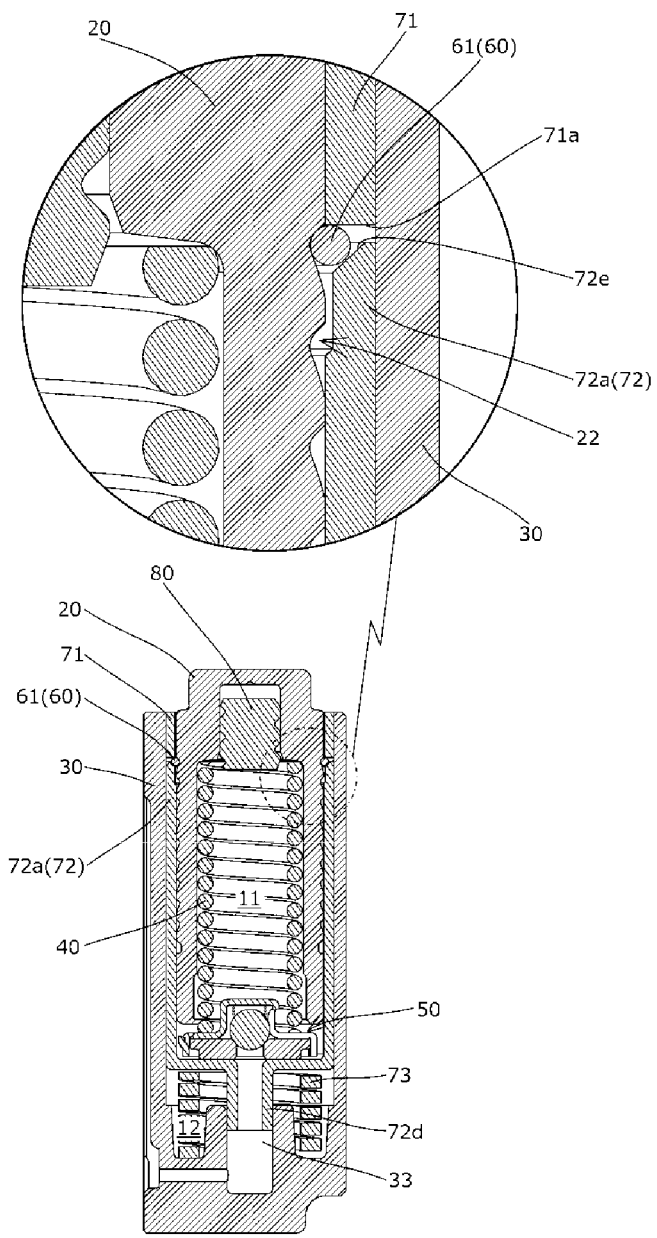
FIG. 5 is an illustrative diagram showing a condition of the tensioner of the first embodiment when oil is not supplied yet.

The ring control mechanism 70 controls the position (movement) in the front to back direction of the resilient ring 60 and includes, as shown in FIG. 5, a front-side restricting part 71 having a front-side restricting surface 71a disposed on the front side of the ring-like part 61 of the resilient ring 60 and capable of restricting forward movement of the ring-like part 61, the rear-side restriction sleeve 72 as a rear-side restriction member having a rear-side restricting surface 72e disposed on the back side of the ring-like part 61 and capable of restricting backward movement of the ring-like part 61, and a restriction spring 73 as a restriction biasing unit for biasing the rear-side restriction sleeve 72 toward the front side.

The front-side restricting part 71 is made of metal such as iron or the like in an annular shape separately from the housing 30 in this embodiment. As shown in FIG. 3 or FIG. 4, the front-side restricting part 71 is press-fit with the inner circumferential surface of the housing hole 31 at the front end of the housing hole 31 whereby it is fixed to the housing 30. The front-side restricting part 71 may be fixed to the housing 30 not necessarily by press-fitting but by any other methods such as adhesion.

A small gap is formed between the inner circumferential surface of the front-side restricting part 71 and the outer circumferential surface of the plunger 20.

The front-side restricting part 71 has the front-side restricting surface 71a at the rear end that can restrict forward movement of the resilient ring 60 by making contact with the ring-like part 61 of the resilient ring 60 as shown in FIG. 5. While the front-side restricting surface 71a in this embodiment is formed as a flat surface perpendicular to the front to back direction, the front-side restricting surface 71a may have any specific form as long as it can restrict forward movement of the resilient ring 60 by making contact with the ring-like part 61 of the resilient ring 60.

The rear-side restriction sleeve 72 is made of metal such as iron and the like and disposed such as to be movable in the front to back direction relative to the housing 30 and plunger 20 as can be seen from FIG. 5 or FIG. 6, and restricts backward movement of the resilient ring 60.

The rear-side restriction sleeve 72 includes, as shown in FIG. 4, a cylindrical sleeve body 72a disposed between the inner circumferential surface of the housing hole 31 and the outer circumferential surface of the plunger 20, a sleeve bottom 72b formed at the rear end of the sleeve body 72a, a sleeve through hole 72c formed in the center of the sleeve bottom 72b, and a cylindrical sleeve tubular part 72d extending from an edge of the sleeve through hole 72c toward the rear side.

A small gap is formed between the outer circumferential surface of the sleeve body 72a and the inner circumferential surface of the housing hole 31. There is also formed a small gap between the inner circumferential surface of the sleeve body 72a and the outer circumferential surface of the plunger 20.

At least part of the sleeve tubular part 72d is inserted into the oil supply hole 33 along the front to back direction such as to be movable in the front to back direction as shown in FIG. 4. There is a small gap between the sleeve tubular part 72d and the oil supply hole 33.

The sleeve body 72a includes the rear-side restricting surface 72e at the front end that can restrict backward movement of the resilient ring 60 by making contact with the ring-like part 61 of the resilient ring 60 as shown in FIG. 5.

The rear-side restricting surface 72e is formed as a taper or an inclined surface radially enlarging toward the front side such as to restrict radial expansion of the ring-like part 61 of the resilient ring 60.

The restriction spring 73 is a coil spring made of metal or the like and disposed at the back of the rear-side restriction sleeve 72 as shown in FIG. 5. More specifically, it is disposed on the rear side of the housing hole 31 and inside the annular recess 32a.

The restriction spring 73 is disposed such as to make contact with the rear end face of the sleeve bottom 72b at one end and to make contact with the bottom surface of the annular recess 32a at the other end.

The restriction spring 73 is designed to have a larger biasing force than of the biasing force of the main spring 40.

The orifice 80 is fixed inside the small-diameter hole 21b of the plunger 20 by press-fitting as shown in FIG. 4. A helical groove is formed on the outer circumferential surface of the orifice 80.

The orifice 80 forms a relief mechanism that discharges unnecessary oil inside the first oil pressure chamber 11 to the outside of the plunger 20 when the oil pressure inside the first oil pressure chamber 11 builds up. More specifically, the oil inside the first oil pressure chamber 11 is released out of the plunger 20 through the gap between the groove of the orifice 80 and the inner circumferential surface of the small-diameter hole 21b and the through hole 23 when the oil pressure inside the first oil pressure chamber 11 builds up.

This relief mechanism also has a deairing function for discharging the air that has entered the first oil pressure chamber 11 out of the first oil pressure chamber 11.

Next, the state of various parts of the tensioner 10 when oil is not supplied yet will be described below mainly with reference to FIG. 5.

At an oil non-supplied time when oil is not supplied to the tensioner 10 (first oil pressure chamber 11) yet, the rear-side restriction sleeve 72 is pressed forward as shown in FIG. 5, since the biasing force of the restriction spring 73 is set larger than the biasing force of the main spring 40.

In this state shown in FIG. 5, the ring-like part 61 of the resilient ring 60 is held by the rear-side restricting surface 72e of the rear-side restriction sleeve 72, the front-side restricting surface 71a of the front-side restricting part 71, and the engaging groove 22 of the plunger 20, whereby the movement in the front to back direction of the ring-like part 61 is restricted, as well as radial expansion of the ring-like part 61 is restricted. As a result of this, the plunger 20 is prevented from moving back and forth relative to the housing 30 and others.

Next, the state of various parts of the tensioner 10 when oil is supplied will be described below mainly with reference to FIG. 6.

The oil supplied to the tensioner 10 from an oil pump through the oil supply hole 33 first flows along the inner side of the sleeve tubular part 72d of the rear-side restriction sleeve 72 and through the check valve 50 into the first oil pressure chamber 11, as well as through the gap between the inner circumferential surface of the oil supply hole 33 and the outer circumferential surface of the sleeve tubular part 72d of the rear-side restriction sleeve 72 into a second oil pressure chamber 12 formed between the housing 30 and the rear-side restriction sleeve 72.

The oil pressure in the first oil pressure chamber 11 at this time is higher than that in the second oil pressure chamber 12 owing to the function of the check valve 50 and vibration or the like transmitted from the drive chain CH to the plunger 20, as a result of which the sleeve bottom 72b is pushed rearward by the oil pressure in the first oil pressure chamber 11, i.e., the rear-side restriction sleeve 72 moves backward as shown in FIG. 6. In this embodiment, the sleeve bottom 72b functions as a pressed part 72b that is disposed at the back of the first oil pressure chamber 11 and pushed rearward by the oil pressure in the first oil pressure chamber 11 when the oil pressure in the first oil pressure chamber 11 rises.

As can be seen from FIG. 5 or FIG. 6, the resistance of oil flow from the oil supply hole 33 into the first oil pressure chamber 11 is set smaller than that of oil flow from the oil supply hole 33 into the second oil pressure chamber 12.

When the rear-side restriction sleeve 72 has moved to the rear side, as shown in FIG. 6, the rear-side restricting surface 72e of the rear-side restriction sleeve 72 is separated from the ring-like part 61 of the resilient ring 60 to the back side, so that the rear-side restricting surface 72e no longer restricts the movement and radial expansion of the ring-like part 61.

When the rear-side restriction sleeve 72 has moved to the rear side, as shown in FIG. 6, the rear surface of the sleeve bottom 72b abuts on the front surface of the housing bottom 32, and the sleeve tubular part 72d is entirely inserted in the oil supply hole 33, so that the second oil pressure chamber 12 is substantially sealed.

Therefore, when the rear-side restriction sleeve 72 tries to move forward, the negative pressure created inside the second oil pressure chamber 12 formed at the back of at least part of the rear-side restriction sleeve 72 (in this embodiment, sleeve bottom 72b) stops this forward movement of the rear-side restriction sleeve 72.

Next, a tensioner 10 according to a second embodiment of the present invention will be described with reference to FIG. 7 to FIG. 10. The second embodiment is, in part, exactly the same as the previously described first embodiment, and therefore the description of its configurations other than the differences will be omitted.

Figure 9:
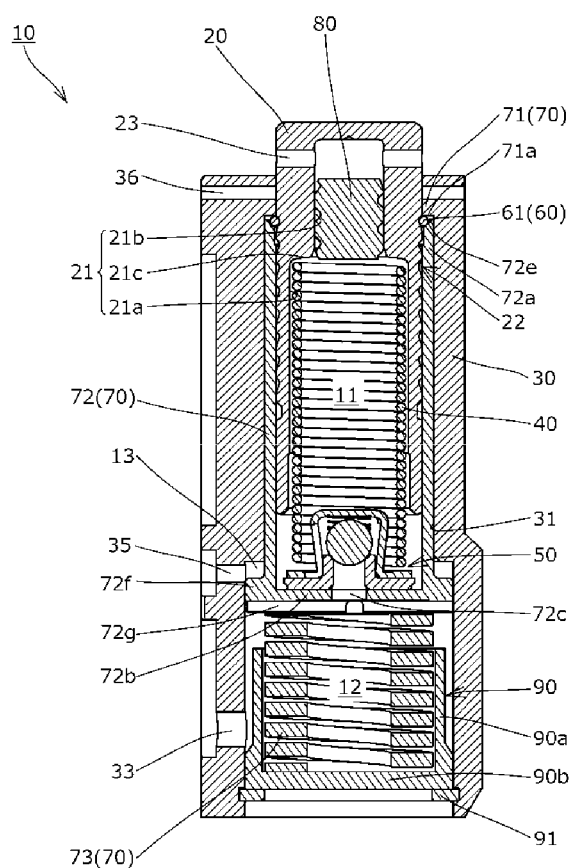
FIG. 9 is an illustrative diagram showing a condition of the tensioner of the second embodiment when oil is not supplied yet.
Figure 10:
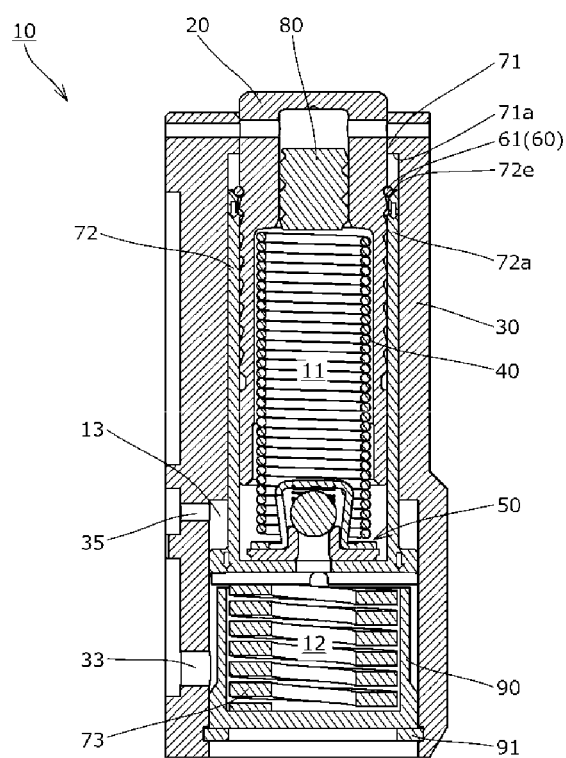
FIG. 10 is an illustrative diagram showing a condition of the tensioner of the second embodiment when oil is supplied.

In the second embodiment, the front-side restricting part 71 is formed integrally with the housing 30 as shown in FIG. 9. More specifically, the front-side restricting part 71 is formed to protrude in an annular shape from an inner circumferential surface of the housing hole 31 at the front end of the housing hole 31.

The front-side restricting part 71 has a front-side restricting surface 71a formed as a flat surface perpendicular to the front to back direction as with the first embodiment.

The housing hole 31 in the second embodiment is formed to open on the rear side too, as shown in FIG. 9. The housing hole 31 includes, as shown in FIG. 9, a large-diameter hole on the rear side, a front-side small-diameter hole continuously and coaxially formed on the front side of the large-diameter hole, and a stepped portion formed between these large-diameter hole and small-diameter hole. Therefore, the rear-side restriction sleeve 72 and restriction spring 73 can be set inside the housing hole 31 from the rear side of the housing 30.

In line with this, the tensioner 10 of the second embodiment includes a spring receiving member 90 made of metal or the like, and a resilient retainer 91 made of metal or the like, as components for preventing the rear-side restriction sleeve 72 and restriction spring 73 from falling off.

Figure 8:
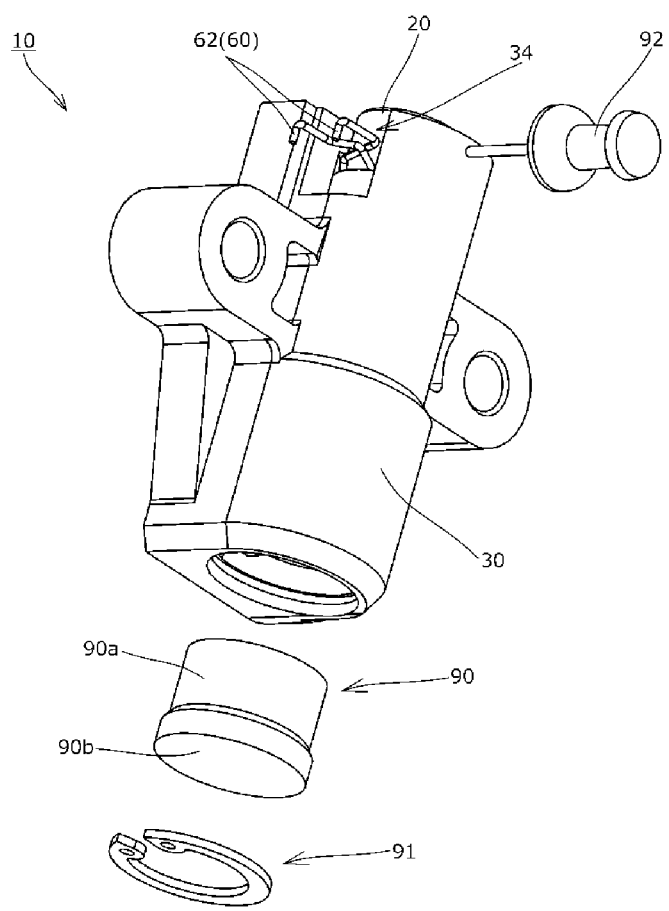
FIG. 8 is a perspective view showing some parts of the tensioner of the second embodiment.

The spring receiving member 90 includes a cylindrical tubular part 90a and a bottom part 90b formed at the rear end of the tubular part 90a as shown in FIG. 8 or FIG. 9.

The spring receiving member 90 is set on the back side of the rear-side restriction sleeve 72, with the restriction spring 73 disposed inside.

The retainer 91 is formed substantially in the form of letter C and fitted in an annular groove formed in the inner circumferential surface of the housing hole 31 at the back of the spring receiving member 90 to prevent the spring receiving member 90 from falling off.

The rear-side restriction sleeve 72 of the second embodiment includes a sleeve body 72a, a sleeve bottom 72b, a sleeve through hole 72c formed in the sleeve bottom 72b, and a flange part 72f extending radially outward from the sleeve body 72a. A cross-shaped oil flow groove 72g is formed in the under surface of the sleeve bottom 72b.

The tensioner 10 in the second embodiment includes a third oil pressure chamber 13, to which oil is introduced from outside (oil pump), separately from the first oil pressure chamber 11.

The third oil pressure chamber 13 is an annular space formed between the inner wall of the housing hole 31 and the rear-side restriction sleeve 72 as shown in FIG. 9. The housing 30 has a second oil supply hole 35 for supplying oil to the third oil pressure chamber 13. The second oil supply hole 35 is connected to the oil pump provided in the engine when the tensioner is attached to the engine block.

Since the tensioner 10 of the second embodiment includes the third oil pressure chamber 13, the oil pressure in the third oil pressure chamber 13 can press the flange part 72f of the rear-side restriction sleeve 72 rearward when oil is supplied to the tensioner 10, so that the rear-side restriction sleeve 72 can move more readily to the rear side when oil is supplied.

This way, in this embodiment, the flange part 72f disposed at the back of the third oil pressure chamber 13 functions as a second pressed part 72f that is pushed rearward by the oil pressure in the third oil pressure chamber 13 when the oil pressure in the third oil pressure chamber 13 rises.

Figure 7:
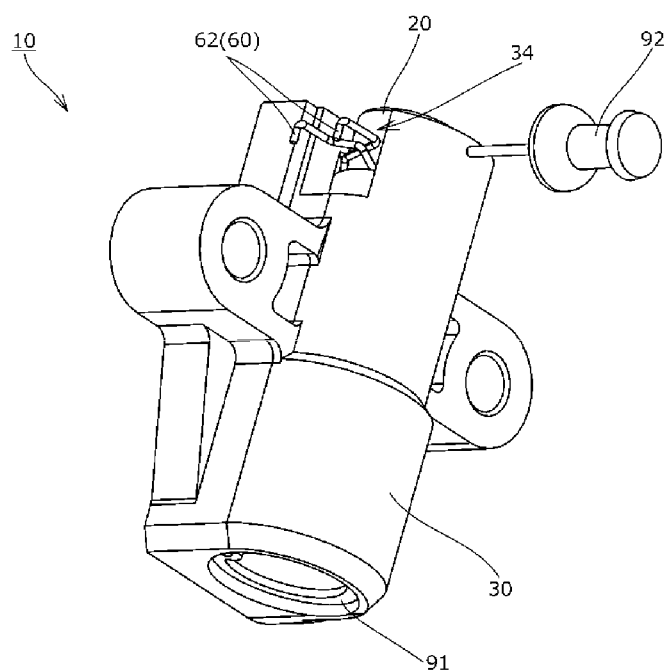
FIG. 7 is a perspective view illustrating a tensioner according to a second embodiment.

The tensioner 10 of the second embodiment further includes, as shown in FIG. 7 or FIG. 8, a stopper pin 92 that is inserted into the through hole 23 formed in the plunger 20 and a through hole 36 formed in the housing 30 to stop forward movement of the plunger 20 relative to the housing 30. The through hole 23 also functions as a relief hole for discharging unnecessary oil in the first oil pressure chamber 11 to the outside of the plunger 20.

While embodiments of the present invention have been described above in detail, the present invention is not limited to these embodiments and may be carried out with various design changes without departing from the scope of the present invention set forth in the claims. Various configurations of several embodiments described above may be freely combined to form other tensioners.

For example, while the tensioner was described as a component to be incorporated in a timing system of a car engine in the embodiments above, the purpose of use of the tensioner is not limited to this specific application.

Also, while the tensioner was described as a component that applies tension to a drive chain with a tensioner lever in the embodiments above, the plunger can directly guide the drive chain slidably with a distal end thereof to apply tension to the drive chain.

The tensioner may not necessarily be applied to a transmission mechanism with a drive chain but can also be used for similar transmission mechanisms that use belts, ropes and the like, and can be applied in a variety of industrial fields where it is required to apply tension to an elongated component.

While the rear-side restriction member was described as a rear-side restriction sleeve having a tubular sleeve body in the embodiments above, the rear-side restriction member may have any specific form as long as it has a rear-side restricting surface positioned at the back of the ring-like part and capable of restricting backward movement of the resilient ring.

While the rear-side restriction member (rear-side restriction sleeve) is moved toward the back side with the use of the oil pressure in the first oil pressure chamber or the third oil pressure chamber in the embodiments above, the means of driving the rear-side restriction member is not limited to the oil pressure. For example, an electric actuator, or an actuator with a shape-memory alloy that changes its shape with temperature changes may be provided to the tensioner, to control the position of the rear-side restriction member (rear-side restriction sleeve) in the front to back direction with this actuator.

While the rear-side restricting surface was described as being formed to restrict radial expansion of the ring-like part in the embodiments above, only at least one of the front-side restricting surface and the rear-side restricting surface may be formed to restrict radial expansion of the ring-like part.

When radial expansion of the ring-like part is to be restricted by the front-side restricting surface, the front-side restricting surface could be formed as a tapered, or inclined surface that radially increases toward the rear side.

What is claimed is:

1. A tensioner comprising: a plunger having a plunger hole that is open on a rear side; a housing having a housing hole that is open on a front side and accommodates the plunger; an oil pressure chamber formed between the plunger and the housing hole; a main biasing unit that biases the plunger toward the front side; a resilient ring having a ring-like part that is disposed on an outer circumference of the plunger and engages with an engaging groove formed on an outer circumferential surface of the plunger; and a ring control mechanism that controls a position of the resilient ring, the ring control mechanism including a front-side restricting part having a front-side restricting surface disposed on the front side of the ring-like part and capable of restricting forward movement of the resilient ring, and a rear-side restriction member having a rear-side restricting surface disposed on the rear side of the ring-like part and capable of restricting rearward movement of the resilient ring, the front-side restricting part being fixed to or formed integrally with the housing, and the rear-side restriction member being disposed movable in a front to back direction relative to the housing and the plunger.

2. The tensioner according to claim 1, wherein at least one of the front-side restricting surface and the rear-side restricting surface is formed such as to restrict radial expansion of the ring-like part.

3. The tensioner according to claim 1, wherein the ring control mechanism includes a restriction biasing unit that biases the rear-side restriction member to the front side, and
the rear-side restriction member is disposed on the rear side of the oil pressure chamber and includes a pressed part that is pushed rearward by an oil pressure in the oil pressure chamber when the oil pressure in the oil pressure chamber rises.

4. The tensioner according to claim 3, wherein the restriction biasing unit is designed to have a larger biasing force than the main biasing unit.

5. The tensioner according to claim 1, wherein the rear-side restriction member is formed as a rear-side restriction sleeve having a sleeve body disposed between an inner circumferential surface of the housing hole and an outer circumferential surface of the plunger.

6. The tensioner according to claim 5, wherein the rear-side restriction sleeve includes a sleeve bottom formed at a rear end of the sleeve body, a sleeve through hole formed in the sleeve bottom, and a sleeve tubular part extending from an edge of the sleeve through hole toward the rear side,
the housing includes an oil supply hole that is formed to extend from an outer surface of the housing through to the housing hole for supplying oil to the oil pressure chamber from outside, and
at least part of the sleeve tubular part is inserted in the oil supply hole.

7. The tensioner according to claim 1, further comprising a third oil pressure chamber to which oil is introduced from outside, wherein
the rear-side restriction member is disposed on the rear side of the third oil pressure chamber and includes a second pressed part that is pushed rearward by an oil pressure in the third oil pressure chamber when the oil pressure in the third oil pressure chamber rises.

8. The tensioner according to claim 1, wherein a second oil pressure chamber formed between the rear-side restriction member and an inner wall of the housing is formed on the rear side of at least part of the rear-side restriction member.

* * * * *